UNITED STATES PATENT OFFICE.

JOHN L. KELLOGG, OF BATTLE CREEK, MICHIGAN.

MANUFACTURE OF BEVERAGE EXTRACTS.

1,163,759. Specification of Letters Patent. Patented Dec. 14, 1915.

No Drawing. Application filed October 14, 1914. Serial No. 866,645.

*To all whom it may concern:*

Be it known that I, JOHN LEONARD KELLOGG, a citizen of the United States, residing at Battle Creek, in the county of Calhoun and State of Michigan, have invented a new and useful Improvement in the Manufacture of Beverage Extracts, of which the following is a specification.

My invention relates in general to the manufacture of beverage extracts, quickly soluble in water, from the starch bearing materials, such as wheat, corn, rye, barley and other cereals, beans, peas, nuts, taro and arrow root. These extracts are intended to be dissolved usually in hot water to be used as a healthful beverage in place of coffee and other beverages considered less healthful.

I am aware that United States patents to Gale No. 48,268, dated June 20, 1865, and to Barotte No. 439,318, dated October 28, 1890, describe a soluble coffee powder produced by evaporation in the ordinary way from an ordinary decoction, extract or solution of coffee.

I am also aware that British patent to Reichert No. 9133 of 1903, describes a soluble beverage powder produced in the same way from chicory, the solid soluble extract thus obtained consisting of extractive matter in solid water soluble form of roasted starchy matter and caramelized saccharine matter.

I am also aware that British Patent No. 6262 of 1895 describes a solid soluble beverage powder produced in the same way from barley malt flour and bran, the solid soluble extract thus obtained consisting of extractive matter in comminuted condition of a roasted cereal or cereal products.

I am also aware that since 1895 a liquid beverage extract made by percolation from a mixture of roasted wheat and bran and caramelized molasses has been in general public use throughout the world, the greatest amount of said mixture of roasted wheat, bran and caramelized molasses having been sold under the adopted name of "Postum cereal." In 1909 and subsequently, I made a soluble beverage powder of this mixture of roasted wheat and bran and caramelized molasses by evaporating to dryness in the usual way the solution obtained by percolation from this mixture.

In a later invention made by me I dispensed entirely with the molasses, sugar, syrup, or other saccharine body which was an essential element of the said earlier product, and relied instead on the addition of malt to the starch bearing material, the whole being so treated by heat and otherwise that the starch was converted by the diastatic action of the malt into maltose and caramelization of the malt ensued. The soluble contents of the product were then dissolved out of the same, the resulting solution evaporated preferably to dryness, and the evaporated solution reduced to a comminuted, preferably granular, condition, thereby forming a solid extract which was quickly soluble in water and when properly prepared made a healthful beverage having the flavor and general characteristics of coffee. For the said later invention I obtained Letters Patent of the United States dated May 26, 1914, which through error, inadvertence and mistake were insufficient properly to protect my invention. I have, therefore, applied for a reissue of said patent, the application therefor having been filed on October 22, 1914, and the patent reissued as of date December 15, 1914, No. 13847.

My present invention is an improvement on the invention set forth in my said reissued patent dated December 15, 1914, whereby the flavor of the solid soluble extract is greatly improved and more nearly resembles the flavor of coffee than any other coffee substitute of which I am aware.

In order that the nature and scope of my invention may be fully understood, I shall first describe in detail one mode in which I now prefer to carry out my invention, and then define in the claims the spirit of the invention and its scope.

In carrying out my invention, at present, I prefer to use as the starch bearing material, a mixture consisting of ten parts bran, five parts wheat flour, five parts corn flour, ten parts rye flour, to which I prefer to add ten parts malt flour and five parts finely ground malt sprouts.

In place of the above starch bearing materials, however, beans, peas, or any starch bearing tubers may be used, likewise nuts, taro, arrow root and similar substances.

I make a heavy dough of the above ingredients, preferably by placing them in an ordinary baker's mixer and mixing with water until the dough is formed. This dough is then by preference molded into loaves which are placed for efficiency and convenience in a warming oven and maintained at such a high temperature for such a time that the diastatic action of the malt will convert part or all of the starch into maltose. I at present achieve the best results by keeping the loaves at a temperature of about 140° to 160° F. for about two hours. The loaves are then, by preference, dried, cut into slices, and ground into granular form, the grains being about the size of beans or peas or smaller. This granular compound is then roasted, preferably by placing in an ordinary coffee roaster, and roasted to a light golden brown, the maltose at the same time becoming caramelized. The soluble contents of the resulting compound are then extracted from the grains, preferably as follows: The roasted grains are placed in a cooker and cooked until all the soluble matter has been extracted. The mass is then placed in a percolator or cooker and hot water poured over the same and drained off repeatedly until all the soluble extract is obtained. This soluble extract is reduced to a granular, or generally speaking, comminuted condition preferably as follows: The soluble extract is evaporated and boiled down to a thick syrup. This syrup is then pumped into a rotary vacuum drier or placed in pans in a vacuum shelf drier and evaporated to dryness. The resulting solid is then ground into the granular form desired.

I find that this method of manufacture is a great improvement over my previous process as the described treatment by heat results in a much more complete conversion of the starchy material in the grains by the diastatic action of the malt. The flavor and solubility of the product is also greatly improved as previously stated.

It is evident that the above described composition of the product and the details of the process set forth may be greatly varied without departing from the scope of my invention.

To determine the spirit and scope of my invention reference is to be had to the following claims.

I claim as my invention:

1. The process of making a soluble beverage extract which comprises warming a mixture containing starch bearing material and malt, so as to convert part or all of the starch into maltose, drying and comminuting the mixture, roasting the dried and comminuted product, dissolving out the soluble contents, evaporating the solution and comminuting the product.

2. The process of making a soluble beverage extract which comprises warming a mixture containing starch bearing material, malt and bran, so as to convert part or all of the starch into maltose, drying and comminuting the mixture, roasting the dried and comminuted mixture, dissolving out the soluble contents, evaporating the solution, and comminuting the product.

3. The process of making a soluble beverage extract which comprises warming a mixture containing starch bearing material, bran and malt sprouts, so as to convert part or all of the starch into maltose, drying and comminuting the mixture, roasting the dried and comminuted mixture, dissolving out the soluble contents, evaporating the solution and comminuting the product.

4. The process of making a soluble beverage extract which comprises making a moist mixture containing starch bearing material and malt, forming the mixture into loaves, warming the loaves, so as to convert part or all of the starch into maltose, drying and comminuting the loaves, roasting the comminuted product, dissolving out the soluble contents, evaporating the solution, and comminuting the product.

5. The process of making a soluble beverage extract which comprises making a moist mixture containing starch bearing material and malt, forming the mixture into loaves, warming the loaves, so as to convert part or all of the starch into maltose, slicing, drying and comminuting the loaves, roasting the comminuted product, dissolving out the soluble contents, evaporating the solution and comminuting the product.

JOHN L. KELLOGG.

In presence of—
  CHAS. M. MARBLE,
  C. H. HUGHES.